(12) United States Patent
Levy

(10) Patent No.: US 6,549,535 B1
(45) Date of Patent: Apr. 15, 2003

(54) METHODS AND APPARATUS FOR PERFORMING PRIMARY RATE INTERFACE (PRI) B-CHANNEL DIRECT CONNECTIVITY IN AN INTEGRATED SERVICES DIGITAL NETWORK (ISDN) COMMUNICATIONS SYSTEM

(75) Inventor: Stephen Levy, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/217,329

(22) Filed: Dec. 21, 1998

(51) Int. Cl.[7] .................................................. H04J 3/12
(52) U.S. Cl. ....................................... 370/360; 370/522
(58) Field of Search ................................. 370/241, 248, 370/250, 251, 431, 437, 522, 523, 524, 525, 526, 360, 465; 379/1, 9, 10, 14, 15, 16; 375/221, 222

(56) References Cited

U.S. PATENT DOCUMENTS

| | | | | |
|---|---|---|---|---|
| 4,730,313 A | * | 3/1988 | Stephenson et al. | 370/241 |
| 4,961,186 A | * | 10/1990 | Sandramouli et al. | 370/437 |
| 4,989,202 A | * | 1/1991 | Soto et al. | 370/250 |
| 5,099,480 A | * | 3/1992 | Murata | 370/250 |
| 5,442,621 A | * | 8/1995 | Ise et al. | 370/250 |
| 5,537,391 A | * | 7/1996 | Ishikawa | 370/250 |
| 5,680,391 A | * | 10/1997 | Barron et al. | 370/241 |

* cited by examiner

Primary Examiner—Dang Ton

(57) ABSTRACT

Methods and apparatus for enabling a program controlled switching system to setup a basic call directly to a specific B-Channel on an ISDN Primary Rate Interface (PRI) via a call initiated by line side equipment subtending the switch with the PRI and/or via a call initiated by equipment anywhere in the Public Switched Telephone Network (PSTN) and routed to the switch with the PRI. A primary application for such methods and apparatus is within Data Tandem Switches/Internet Concentrator Switches and End Office Switches with PRI connections for Internet Service Providers. For example, by facilitating a direct connection to a specific B-Channel using the invention, modem pool providers can quickly and efficiently verify the functionality of specific channels and their associated modems, as well as maintain and test other equipment and software associated a specific PRI B-Channel.

21 Claims, 3 Drawing Sheets

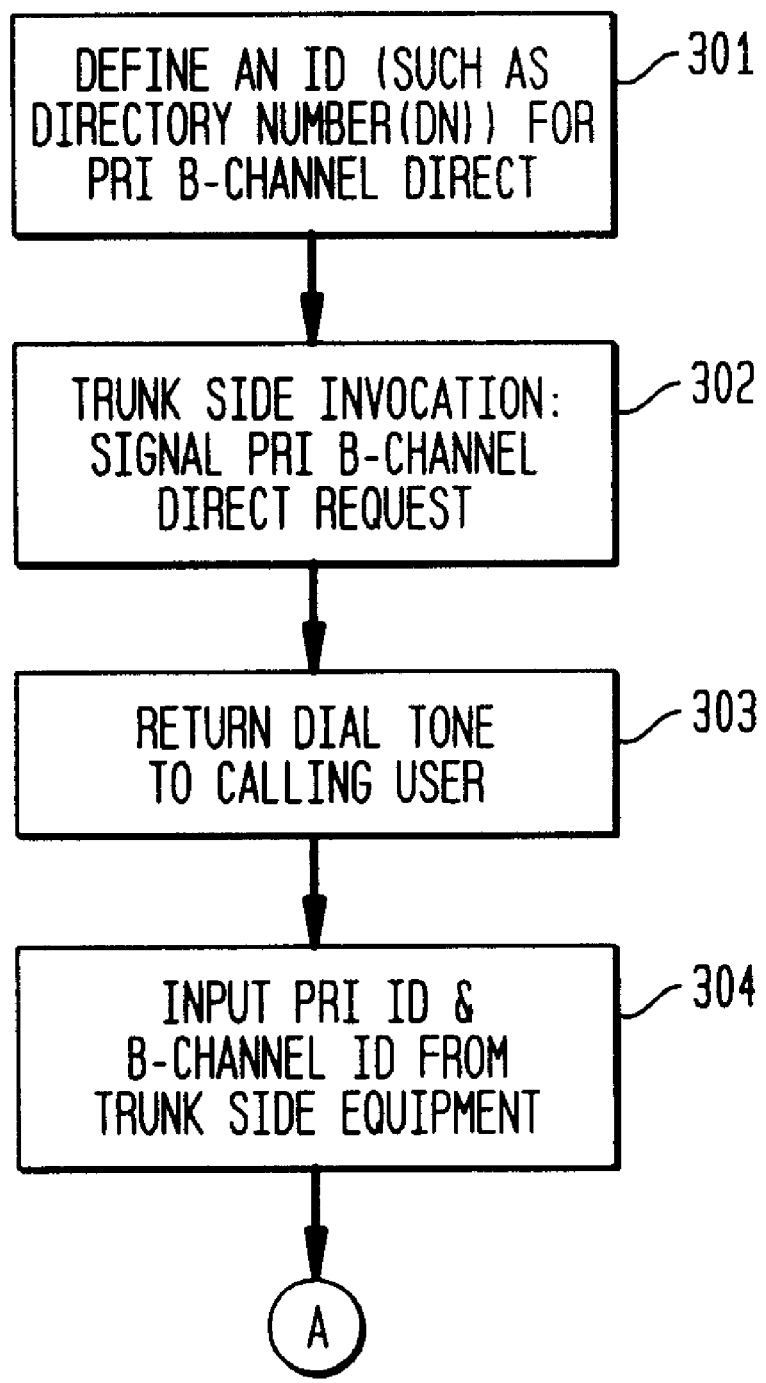

METHODS AND APPARATUS FOR PERFORMING PRIMARY RATE INTERFACE (PRI) B-CHANNEL DIRECT CONNECTIVITY IN AN INTEGRATED SERVICES DIGITAL NETWORK (ISDN) COMMUNICATIONS SYSTEM

BACKGROUND OF THE INVENTION

1. Field of the Invention

The invention relates generally to methods and apparatus for directly connecting users of a telephone communications system to a specific ISDN PRI B-Channel using a program controlled switch such as, for example, a data tandem switch, an internet concentrator or an end office switch.

More particularly, the invention relates to methods and apparatus which enable the functionality of equipment that can be associated with a specific B-Channel, such as the modems in an Internet Service Provider's (ISP's) a modem pool, etc., to be directly and conveniently accessed from equipment subtending the switch and/or from equipment located external to the switch, connected thereto by (for example) the Public Switched Telephone Network (PSTN).

2. Brief Description of the Related Art

Integrated Services Digital Network (ISDN) Primary Rate Interface (PRI) call control switching and signalling techniques are well known to those skilled in the art. For background purposes, reference may be made to the Bellcore TR publication entitled "ISDN Primary Rate Interface Call Control Switching and Signalling Generic Requirements for Class II Equipment", TR-NWT-001268, 1 Issue December 1991.

Furthermore, program controlled switches of the type that may be used to implement the invention are well know to those skilled in the art as exemplified by the commercially available Siemens AG, EWSD Switching System ("EWSD" is a registered trademark of Siemens AG, Federal Republic of Germany).

Presently, in order to test and maintain devices and services provided to users of a telephone communications system, such as access to the internet via modems located in modem pools provided by ISP's, etc., a large number of test calls may be required to isolate a specific device (such as, for example, a modem coupled to a specific B-Channel) for testing or servicing. This is because there are currently no known methods or apparatus for setting up a call directly to the specific PRI B-Channel associated with the device to be tested.

Trial and error, repeated calling in an attempt to attain the desired connectivity between the user and device to be tested, etc., is required. Such techniques to achieve connectivity to a specific device associated with a specific PRI B-Channel from a line subtending a switch with the PRI; or from an external location via the PSTN, are inexact (if not impossible) as well as very costly and time consuming.

Accordingly, it would be desirable to provide methods and apparatus for providing direct connectivity to a specific B-channel on a specific Primary Rate Interface (PRI) in an Integrated Services Digital Network (ISDN) communications system.

This type of functionality could be used in conjunction with PRIs that support connections for dial up ISP access. This would allow the Point Of Presence (POP) and/or the ISP to verify the functionality of specific B-Channels/ modems (and other hardware and software modules) on a PRI, quickly, easily and cost effectively.

Furthermore, it would be desirable to provide methods and apparatus for use with an Integrated Services Digital Network (ISDN) communications system including a program controlled switch with at least one Primary Rate Interface (PRI), for providing connectivity to a specific B-channel on a specific Primary Rate Interface (PRI), from either line side equipment subtending the switch and/or from a location remote from the switch using, for example, the PSTN.

The setting up of a call directly to, for example, a specified B-Channel/modem (using the aforestated desired methods and apparatus), allows the modem pool provider to use the PSTN interface that exists for the public to verify the functionality of a modem. An operations center, located anywhere in the PSTN, can use its modem test equipment to make one call and be connected to any of its modems that are interfacing to the PSTN via a switching system that utilizes the invention.

SUMMARY OF THE INVENTION

It is therefore a general object of the invention to provide methods and apparatus for providing connectivity to a specific B-channel on a specific Primary Rate Interface (PRI) in an Integrated Services Digital Network (ISDN) communications system.

It is a specific object of the invention to provide methods and apparatus for use with an Integrated Services Digital Network (ISDN) communications system including a program controlled switch with at least one Primary Rate Interface (PRI), for providing connectivity to a specific B-channel on a specific Primary Rate Interface (PRI), from either line side equipment subtending the switch and/or from a location remote from the switch using, for example, the PSTN.

Furthermore, it is an object of the invention to provide methods and apparatus for enabling the functionality of devices and services provided to users of a telephone communications system to be easily, economically and efficiently tested and maintained by providing methods and apparatus for setting up a call directly to specific PRI B-Channels when such channels are each associated with a particular device or service to be tested and maintained.

It is still a further object of the invention to provide methods and apparatus for specifically verifying modem functionality in an Integrated Services Digital Network (ISDN) communications system, including a program controlled switch with at least one Primary Rate Interface (PRI), wherein each of a set of modems are connected to said switch via specific B-Channels on at least one PRI.

Further still, it is an object of the invention to provide methods and apparatus for specifically verifying modem functionality in an Integrated Services Digital Network (ISDN) communications system, including a program controlled switch with at least one Primary Rate Interface (PRI), from either line side equipment subtending the switch and/or from a location remote from the switch using, for example, the PSTN.

According to a first aspect of the invention, a method for providing connectivity through an Integrated Services Digital Network (ISDN) communications system, including a program controlled switch with at least one Primary Rate Interface (PRI), to a specific B-channel on a specific PRI from a line subtending the switch, comprises the steps of (a) defining an access code for invoking a direct connection via the switch to a specific B-Channel on a specific PRI; (b) providing the switch, via a call initiated by the line side equipment, data including at least the access code, a specific B-channel identifier and a specific PRI identifier; (c) translating the access code at the switch to invoke direct connection via the switch to the specific B-Channel and PRI identified; (d) collecting the B-Channel identifier and PRI identifier provided to the switch with the access code; (e) routing the call via the switch to the PRI identified by the collected PRI identifier; and (f) setting up the call via the switch to the specific B-Channel identified by the collected B-Channel identifier to thereby provide connectivity to the specified B-channel.

In accordance with the aforestated first aspect of the invention, the invention further contemplates the step of associating each of a set of modems in a modem pool (or in fact, instances of other types of equipment as well, such as circuit cards, etc.), with a specific B-Channel on a PRI to thereby enable modem (or other type of hardware or software) functionality to be verified via direct connection thereto from the line subtending the switch.

In accordance with each aspect of the invention described herein the "switch" could be a data tandem switch; an internet concentrator switch; or an end office switch.

According to a second aspect of the invention, a method for providing connectivity through an Integrated Services Digital Network (ISDN) communications system, including a program controlled switch with at least one Primary Rate Interface (PRI), to a specific B-channel on a specific PRI from a location remote from the switch, comprises the steps of: (a) defining a signal (for example, a predefined Directory Number (DN)) to indicate that a call to the switch using the signal (DN) is for invoking a direct connection via the switch to a specific B-Channel on a PRI from a location external thereto; (b) returning a dial tone from the switch to the location external upon receipt of a call to the switch using the signal (DN); (c) providing the switch, via data input from the location external following receipt of said dial tone, data including at least a specific B-channel identifier and a specific PRI identifier; (d) collecting the B-Channel identifier and PRI identifier provided to the switch; (e) routing the call via the switch to the PRI identified by the collected PRI identifier; and (f) setting up the call via the switch to the specific B-Channel identified by the collected B-Channel identifier to thereby provide connectivity to the specified B-channel.

In accordance with the aforestated second aspect of the invention, the invention further contemplates the step of associating each of a set of modems in a modem pool (or again in fact, instances of other types of equipment as well, such as circuit cards, etc.), with a specific B-Channel on a PRI to thereby enable modem functionality to be verified via direct connection thereto from the location external over the PSTN.

According to a third aspect of the invention, a method for verifying modem functionality using an Integrated Services Digital Network (ISDN) communications system, including a program controlled switch with at least one Primary Rate Interface (PRI), wherein each of a set of modems are connected to the switch via specific B-Channels on the at least one PRI, comprises the steps of: (a) associating each of a set of modems in a modem pool with a specific B-Channel on the at least one a PRI; and (b) providing direct connectivity via the switch to a specific B-channel on a specific PRI to thereby enable modem functionality to be verified via the direct connection thereto.

Furthermore, in accordance with this third aspect of the invention, the step of providing direct connectivity further comprises the step of (a) utilizing line side equipment subtending the switch to input to the switch the identity of the specific PRI and specific B-Channel to be directly connected to; and/or (b) utilizing externally located equipment that interfaces with the switch via trunk over the Public Switched Telephone Network (PSTN) to input to the switch the identity of the specific PRI and specific B-Channel to be directly connected to.

According to still further aspects of the invention, apparatus are described for implementing the aforestated methods.

The invention features methods and apparatus which allow a program controlled switching system, such as the exemplary previously referenced EWSD Switching System, to setup a basic call directly to a specific B-Channel on a PRI via a call initiated by line side equipment subtending the switch with the PRI and/or via a call initiated by equipment anywhere in the PSTN and routed to the switch with the PRI.

The invention allows for the PRI B-Channel direct feature to be implemented in switch implementations of both National ISDN PRI and Custom PRI.

A primary application for the invention is within Data Tandem Switches, Internet Concentrator Switches and End Office Switches with PRI connections for Internet Service Providers. By allowing a direct connection to a specific B-Channel, modem pool providers can quickly and efficiently verify the functionality of specific channels and their associated modems. This feature would provide a switch with a very distinct advantage in the maintenance area of POP/ISP PRI connectivity as comparable functionality is not currently available.

Additional objects and advantages of the invention will become apparent to those skilled in the art upon reference to the detailed description taken in conjunction with the provided figures.

BRIEF DESCRIPTION OF THE DRAWINGS

FIG. 3 depicts, in the form of a flow chart, an exemplary method that illustrates how the invention may be implemented to support a PRI B-Channel direct feature invoked using trunk side equipment remotely located from the target switch.

DETAILED DESCRIPTION

Figure 1:
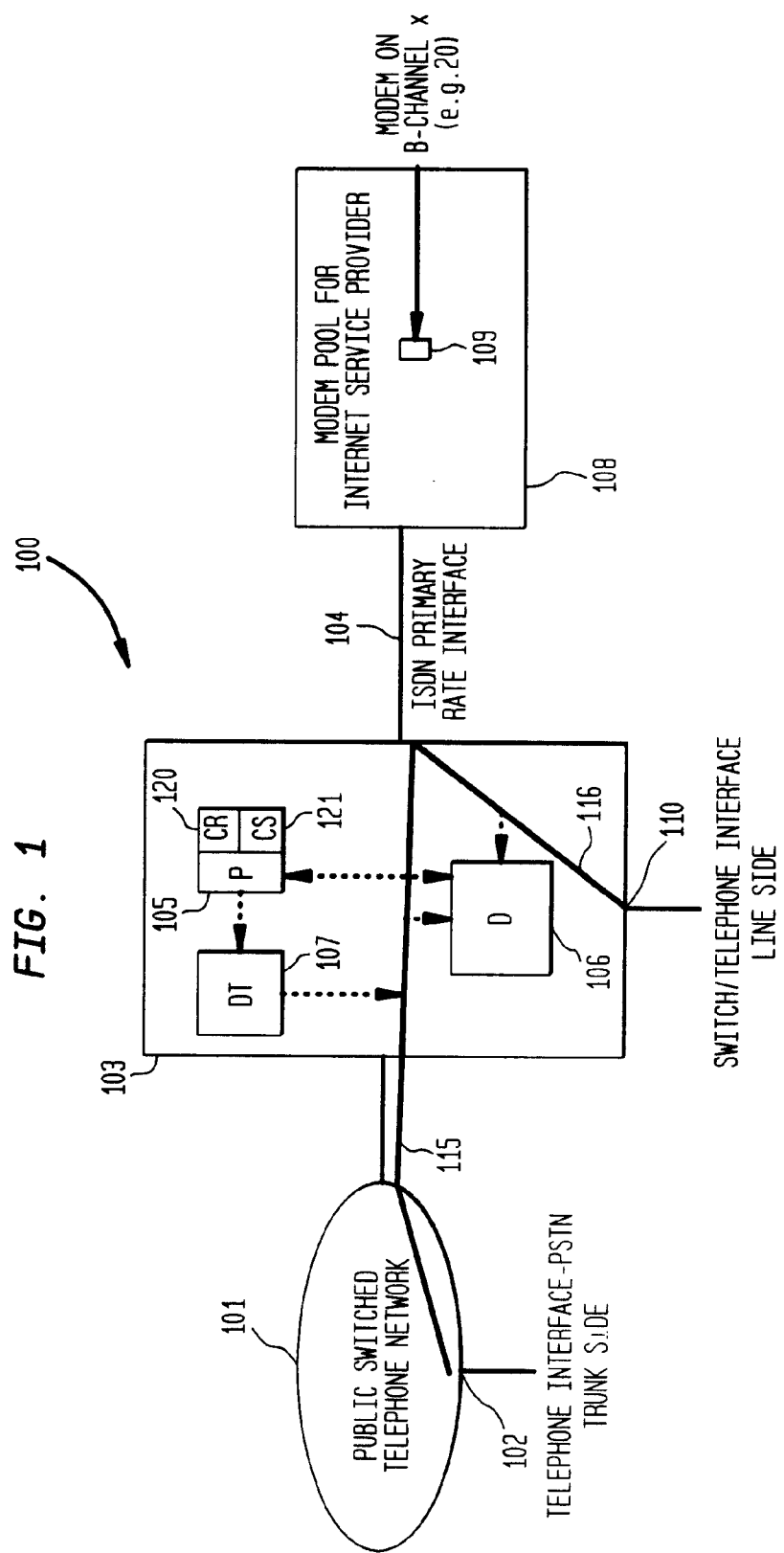
FIG. 1 illustrates how the invention may be used and implemented in a telephone communications system in conjunction with an exemplary program controlled ISDN switch having at least one PRI.

As indicated hereinabove, FIG. 1 illustrates how the invention may be used and implemented in a telephone communications system in conjunction with an exemplary program controlled ISDN switch having at least one PRI.

In particular, with reference to FIG. 1, telephone communications system 100 is depicted including: PSTN 101; trunk side telephone interface 102 to PSTN 101; program controlled ISDN switch 103 including at least one PRI (shown as PRI 104 in FIG. 1); call processor 105 (including call routing means 120 and call set up means 121), data storage device 106 and dial tone generator 107, all located at switch 103; modem pool 108 including modem 109 specifically associated with a particular B-Channel; and line side interface 110 to switch 103.

Signals (data) input to switch 103 from either trunk side telephone interface 102 or line side interface 110 are illustratively shown as communicated to switch 103 via calls on links 115 and 116 respectively. Data is illustratively shown as processed at switch 103 via call processor 105 which obtains input signals (data) from data storage device 106. Dial tone generator 107 is shown under the control of call processor 105. Call routing and call set up modules 120 and 121 respectively, in switch 103 operating under the control of call processor 105, used by the methods and apparatus constituting the invention, are well known to those skilled in the art and will not be described further herein.

It is within the context of the illustrative telephone communications system shown in FIG. 1 that the principals of the invention will be described.

The ISDN PRI B-Channel Direct feature contemplated by the invention provides the ability for a customer to dial digits to identify both the PRI and the B-Channel within the PRI to which the customer wishes to be connected.

There are at least two ways to invoke the PRI B-Channel Direct feature: (1) from a line subtending program controlled switch, such as switch 103, with the PRI of B-Channel to be connected; and (2) from, for example, the PSTN via a trunk interface to the switch with the PRI of B-Channel to be connected.

To invoke the PRI B-Channel Direct feature from a line subtending exemplary switch 103 with PRI 104, the user would, according to a preferred embodiment of the invention, provide a digit string to switch 103 via equipment (not shown) coupled to interface 110, which would identify three things: (1) the invocation of the feature by providing a predefined access code; (2) the identification of the specific B-Channel (a B-Channel Identifier) via a number in a predefined range (for example, 1–119 where 5 PRI capacity is available; 1–23 where a single PRI is used, etc.); and (3) the identification of the PRI (a PRI Identifier) via, for example, a 7 or 10 digit PRI Directory Number (DN). A digital telephone set could, for example, be connected to interface 110 and provide the aforementioned inputs.

As a specific example, equipment interconnected to interface 110 could be used to dial in *2420#9411234 to switch 103, where *24 represents a predefined access code to invoke the PRI B-Channel Direct feature, 20 identifies the B-Channel to be connected and 9411234 represents the DN of the PRI.

A "#" is used in the example set forth hereinabove to delineate the B-Channel number from the PRI DN to allow, according to the illustrative embodiment of the invention, for either a 1, 2, or 3 digit B-Channel number.

The data input via interface 110 is illustratively shown as routed to data storage device 106 where it may be obtained by call processor 105 for translation via, for example, a program module designed to perform the translation function; and further program modules designed to facilitate call routing and call set up based on collected and delineated PRI IDs and B-Channel IDs.

Ultimately, with reference to the line side example set forth hereinabove and FIG. 1, call processor 105 would route the call via link 116 from interface 110 to the PRI identified by "9411234" (PRI 104 being presumed for the sake of illustration only to be PRI 9411234); and set the call up on B-Channel 20 as requested (assuming the channel is available), to directly access modem 109 in modem pool 108.

Once again, according to the preferred embodiment of the invention, using the line side interface, the user would dial an access code, the B-Channel number, and the DN identifying the actual PRI of the B-Channel. The access code may be defined on a per switch basis, although a customer with multiple switches may certainly use the same access code for all their switches.

The B-Channel number can identify any DSO on the PRI, (except a DSO functioning a a D-Channel, e.g. port 24 on a PRI with a D-channel or backup D-channel). Where a DN is used for identifying the PRI, the DN may be assigned as part of creation of the PRI.

An exemplary method for processing the interface 110 inputs and providing connectivity to a specified B-Channel, will be set forth hereinafter in detail with reference to FIG. 2.

According to a further illustrative embodiment of the invention, to invoke the PRI B-Channel Direct feature from a location external to switch 103 (trunk side), such as from telephone-PSTN interface 102 (coupled to switch 103 via PSTN 101), the user would provide a 2 stage sequence of digits to the switch. A digital telephone connected to interface 102 could, once again, serve as a means for providing a sequence of digits to switch 103.

In the first stage, a reserved office DN (or any other unique signalling method to identify that the PRI B-Channel Direct feature is to be invoked) could be used to route the call to switch 103 via link 115. In response to this DN, switch 103 would return Dial Tone to the calling user. Dial tone generator 107, operating under control of call processor 105, could be used to send a dial tone back to the interface 102 (upon call processor 105 recognizing the DN associated with invoking the PRI B-Channel Direct feature), to enable the second stage of digits to be input by the user.

In the second stage contemplated by the instant illustrative embodiment of the invention, the identification of the B-Channel via a number (e.g., a number in the range 1–119 for 5 PRI capacity, 1–23 for a single PRI, etc.), and the identification of the PRI (e.g., via a 7 or 10 digit PRI DN), are input to switch 103 after receipt of the dial tone from switch 103 (actually a second dial tone for the calling equipment).

An example of this would be for the user to first dial 8609410000. This would connect the user to switch 103 (e.g., an Internet Concentrator, end office switch, etc.), and have dial tone returned.

The user would then dial, for example, 20#8609411234, where 20 identifies the B-Channel to be connected and 8609411234 represents the DN of the PRI. A "#" once again used in the example to delineate the B-Channel number from the PRI DN to allow for either a 1, 2, or 3 digit B-Channel number.

Ultimately, with reference to the trunk side example set forth hereinabove and FIG. 1, call processor 105 would route the call via link 115 from interface 102 to the PRI identified by "8609411234" (PRI 104 being presumed for the sake of illustration only to be PRI 8609411234); and set the call up on B-Channel 20 as requested (assuming the channel is available), to directly access modem 109 in modem pool 108.

In summary, interfacing via trunk, the user could dial a DN that would route to the switch where the PRI B-Channel resides (for example PRI 104 for switch 103 as per the aforestated examples). The switch (such as exemplary switch 103) would return a dial tone (actually the second dial tone for the user; the first tone being provided locally to allow input of the DN); and thereafter the user would dial the B-Channel number and the DN identifying the actual PRI of the B-Channel.

The initial DN could be a DN with an Numbering Plan Area ("area code") and office code routed through the PSTN to the required switch. The switch must be programmed to identify ("translate") the DN as the DN to invoke PRI B-Channel Direct. Developing a program module to recognize a predefined DN and invoking the PRI B-Channel direct feature upon detection of the DN is well within the purview of those of ordinary skill in the art. The B-Channel number and the DN of the PRI are the same as described hereinabove for the line side interface.

An exemplary method for processing the interface 102 inputs and providing connectivity to a specified B-Channel, will be set forth hereinafter in detail with reference to FIG. 3.

The invention will now be further described with reference to a preferred embodiment thereof (one that makes explicit use of an ISDN PRI Directory Number (DN) to invoke the PRI B-Channel Direct Feature from a truck side location remote from the switch). Other mechanisms for signalling the switch from an external location to invoke the PRI B-Channel Direct feature may be devised by those skilled in the art and are intended to all come within the purview of the invention.

The functional requirements to implement the invention as described hereinabove can be divided into three functional areas: (1) Administration; (2) Line Side Invocation; and (3) Trunk Side Invocation.

From the administration point of view: (1) all interfaces that support the PRI B-Channel Direct feature should be defined; (2) a new access code (or codes) should be defined to allow for line side invocations of the PRI B-Channel Direct feature, as described in the aforementioned line side invocation example (i.e., an access code type which indicates that the subscriber is performing a PRI B-Channel Direct call and will follow the access code with a B-Channel number and a PRI ID, such as a line DN); and (3) for trunk side invocations of the PRI B-Channel Direct feature, a signal (such as a specially designated DN coming into the target switch) needs to be defined so that a translation of the signal results in the target switch returning dial tone on the trunk; and then collecting the B-Channel number and the PRI ID (e.g., DN) input during the aforementioned "second stage".

Figure 2:
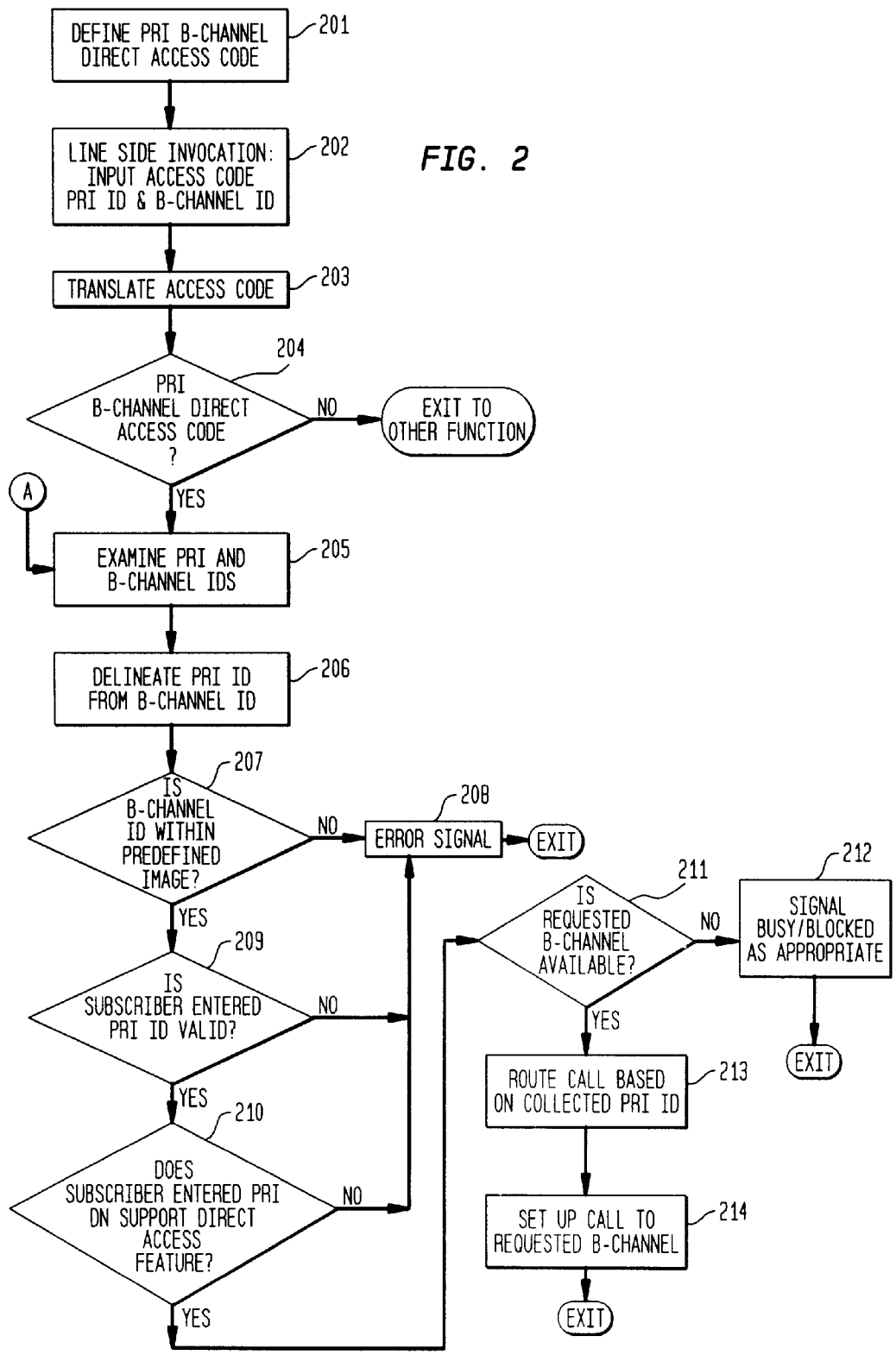
FIG. 2 depicts, in the form of a flow chart, an exemplary method that illustrates how the invention may be implemented to support a PRI B-Channel direct feature invoked using line side equipment.

Reference should now be made to FIG. 2 which, as previously indicated, depicts, in the form of a flow chart, an exemplary method that illustrates how the invention may be implemented to support a PRI B-Channel direct feature invoked using line side equipment.

According to one method contemplated by the invention, an access code representing the PRI B-Channel Direct feature must first be defined (as shown at Block 201 in FIG. 2); and be input to the target switch along with PRI ID and B-Channel ID information (as shown at Block 202 in FIG. 2) to invoke the PRI B-Channel Direct feature using line side equipment (e.g., a line subtending the switch itself).

As shown at Block 203 in FIG. 2, the access code must be first translated. If the access code presented to the target switch is not a PRI B-Channel Direct feature access code, processing at the target switch is shown follow a path from Block 204 in FIG. 2 that allows the function called for to be processed ("Exit To Other Function" in FIG. 2).

If a proper defined PRI B-Channel Direct feature access code is detected at Block 204 (by, for example, call processor 105), the B-Channel number and PRI ID (such as a predefined DN) have to be examined (as shown at Block 205 in FIG. 2).

Next, the target switch must be able to delineate the B-Channel number from the PRI DN (Block 206 in FIG. 2). As explained hereinbefore a "#" could be used as the delineation character by placing the # after the B-Channel number.

The flow chart in FIG. 2 next depicts several tests which, for the sake of convenience and illustration only, are shown following the delineation of the B-Channel ID and PRI ID.

First, a test is shown at Block 207 to determine if the B-Channel ID is within a predefined range. Thus, for example, if only a single PRI capacity is defined at the switch and the user tries to connect to B-Channel 55 (when only 23 channels at most are available); an error is to be signalled as shown at Block 208 in FIG. 2.

If the B-Channel request is within range, a test could next be performed to determine if the subscriber has entered a valid PRI ID. This is shown at Block 209 in FIG. 2. If not, an error should once again be signalled as shown by the path from Block 209 in FIG. 2 to Block 208 in FIG. 2.

Next, a test can be performed to determine if the subscriber entered DN (assuming a DN type PRI ID) supports the PRI B-Channel Direct access feature. This is shown at Block 210 in FIG. 2. If not, an error should yet again be signalled as shown by the path from Block 210 in FIG. 2 to Block 208 in FIG. 2.

The target switch should also be programmed, according to the preferred embodiment of the invention, to determine if the requested B-Channel is available. This is shown at Block 211 in FIG. 2. If not available, a B-Channel blocked or busy signal, as shown developed at Block 212 in FIG. 2, should be returned by the switch.

Finally, if all the recommended tests are passed, the switch should route the call based on the collected PRI ID (as shown at Block 213 in FIG. 2); and then complete call set up to the requested B-Channel (as shown at Block 214 in FIG. 2). This would complete the line side implementation of the desired direct connection to a B-Channel.

Reference should now be made to FIG. 3 which, as previously indicated, depicts, in the form of a flow chart, an exemplary method that illustrates how the invention may be implemented to support a PRI B-Channel direct feature invoked using trunk side equipment remotely located from the target switch.

According to one method contemplated by the invention, a signal, such as a DN, first needs to be defined (as shown at Block 301 in FIG. 3). In the case of a DN being defined to cause the PRI B-Channel feature to be invoked, the user at the remote location (such as a user at interface 102 in FIG. 1) would dial the DN to signal the PRI B-Channel Direct request to the target switch (such as switch 103 in FIG. 1). This truck side invocation of the desired feature is represented at Block 302 in FIG. 3.

As explained hereinbefore, the signal needs to be defined so that a translation of the signal by the target switch results in the switch returning dial tone on the trunk (as shown at Block 303 in FIG. 3).

Next, the user, on receipt of the dial tone from the switch, inputs the specific PRI ID and B-Channel ID connection request. This was demonstrated hereinbefore by way of example.

The flow chart depicted in FIG. 3 is then shown flowing into Block 205 of FIG. 2 (at "A"). This is because the remainder of the exemplary processing flow contemplated by this illustrative embodiment of the invention (for trunk side invocations of the PRI B-Channel Direct feature) could be the same as set forth herein for line side processing (illustrated and described hereinbefore with reference to Blocks 205–214 of FIG. 2).

Once the connection to the desired B-Channel is established utilizing any of the aforestated methods and apparatus, the user can test and maintain specific equipment (like a modem in a modem pool); and services provided by whatever unit or module is known to be associated with a specific B-Channel.

While particular embodiments of the invention have been described, it is not intended that the invention be limited thereto, as it is intended that the invention be as broad in scope as the art will allow and that the specification be read likewise.

It will therefore be appreciated by those skilled in the art that yet other modifications could be made to the provided invention without deviating from its spirit and scope as so claimed.

What is claimed is:

1. A method for providing connectivity through an Integrated Services Digital Network (ISDN) communications system including a program controlled switch with at least one Primary Rate Interface (PRI), to a specific B-channel on a specific PRI from a line subtending said switch, comprising the steps of:
   (a) defining an access code for invoking a direct connection via said switch to a specific B-Channel on a specific PRI;
   (b) providing said switch, via a call initiated by line side equipment, data including at least said access code, a specific B-channel identifier and a specific PRI identifier;
   (c) translating said access code at said switch to invoke direct connection via said switch to the specific B-Channel and PRI identified;
   (d) collecting said B-Channel identifier and PRI identifier provided to said switch with said access code;
   (e) routing said call via said switch to the PRI identified by said collected PRI identifier; and
   (f) setting up the call via said switch to the specific B-Channel identified by said collected B-Channel identifier to thereby provide connectivity to the specified B-channel.

2. A method as set forth in claim 1 further comprising the step of associating each of a set of modems in a modem pool with a specific B-Channel on a PRI to thereby enable modem functionality to be verified via direct connection thereto from the line subtending said switch.

3. A method as set forth in claim 1 further comprising the step of delineating the collected B-Channel identifier from said PRI identifier.

4. A method as set forth in claim 1 wherein said switch is a data tandem switch.

5. A method as set forth in claim 1 wherein said switch is an internet concentrator switch.

6. A method as set forth in claim 1 wherein said switch is an end office switch.

7. A method for providing connectivity through an Integrated Services Digital Network (ISDN) communications system including a program controlled switch with at least one Primary Rate Interface (PRI), to a specific B-channel on a specific PRI from a location remote from the switch, comprising the steps of:
   (a) defining a signal to indicate that a call to said switch using said signal is for invoking a direct connection via said switch to a specific B-Channel on a PRI from a location external thereto;
   (b) returning a dial tone from said switch to said location external upon receipt of a call to said switch using said signal;
   (c) providing said switch, via data input from said location external following receipt of said dial tone, data including at least a specific B-channel identifier and a specific PRI identifier;
   (d) collecting said specific B-Channel identifier and said specific PRI identifier provided to said switch;
   (e) routing said call via said switch to the PRI identified by said collected PRI identifier; and
   (f) setting up the call via said switch to the specific B-Channel identified by said collected B-Channel identifier to thereby provide connectivity to the specified B-channel.

8. A method as set forth in claim 7 wherein said step of providing further comprises the step of inputting said specific B-channel identifier and a specific PRI identifier to said switch in the form of inband DTMF digits.

9. A method as set forth in claim 8 further comprising the steps of:
   (a) hooking up a code receiver to collect said inband DTMF digits input to said switch;
   (b) collecting said DTMF digits; and
   (c) storing collected DTMF digits within said switch.

10. A method as set forth in claim 9 further comprising the step of delineating the B-Channel identifier from the PRI identifier.

11. A method as set forth in claim 7 wherein said location external interfaces with said switch via trunk over a Public Switched Telephone Network (PSTN).

12. A method as set forth in claim 11 further comprising the step of associating each of a set of modems in a modem pool with a specific B-Channel on a PRI to thereby enable modem functionality to be verified via direct connection thereto from said location external over the PSTN.

13. A method as set forth in claim 7 wherein said switch is a data tandem switch.

14. A method as set forth in claim 7 wherein said switch is an internet concentrator switch.

15. A method as set forth in claim 7 wherein said switch is an end office switch.

16. A method for verifying modem functionality using an Integrated Services Digital Network (ISDN) communications system, including a program controlled switch with at least one Primary Rate Interface (PRI), wherein each of a set of modems are connected to said switch via specific B-Channels on said at least one PRI, comprising the steps of:
   (a) associating each of a set of modems in a modem pool with a specific B-Channel on said at least one PRI;
   (b) providing direct connectivity via said switch to a specific B-channel on a specific PRI to thereby enable modem functionality to be verified via the direct connection thereto; and
   (c) utilizing line side equipment subtending said switch to input to said switch the identity of the specific PRI and specific B-Channel to be directly connected to.

17. A method for verifying modem functionality using an Integrated Services Digital Network (ISDN) communications system, including a program controlled switch with at least one Primary Rate Interface (PRI), wherein each of a set of modems are connected to said switch via specific B-Channels on said at least one PRI, comprising the steps of:

(a) associating each of a set of modems in a modem pool with a specific B-Channel on said at least one PRI;

(b) providing direct connectivity via said switch to a specific B-channel on a specific PRI to thereby enable modem functionality to be verified via the direct connection thereto; and (c) utilizing externally located equipment that interfaces with said switch via said switch trunk over the Public Switched Telephone Network (PSTN) to input to said switch the identity of the specific PRI and specific B-Channel to be directly connected to.

18. Apparatus for providing connectivity to a specific B-channel on a specific Primary Rate Interface (PRI) in an Integrated Services Digital Network (ISDN) communications system, comprising:

(a) a program controlled switch with at least one Primary Rate Interface (PRI);

(b) line side equipment subtending said switch for providing data thereto including a predefined access code for invoking a direct connection to a specific B-Channel on a switch PRI, a specific B-channel identifier and a specific PRI identifier; and (c) a program module associated with said program controlled switch for translating said predefined access code to invoke said direct connection to the specific B-Channel identified by said B-Channel identifier on the specific PRI identified by said PRI identifier.

19. Apparatus as set forth in claim 18 wherein said switch further comprises:

(a) a program module associated with said program controlled switch for collecting said B-Channel identifier and PRI identifier provided with said access code;

(b) call routing means for routing the call via said switch to the PRI identified by said collected PRI identifier; and (c) call set up means for setting up the call via said switch to the specific B-Channel identified by said collected B-Channel identifier to thereby provide connectivity to the specified B-channel on said specific PRI from the line side equipment subtending said switch.

20. Apparatus for providing connectivity to a specific B-channel on a specific Primary Rate Interface (PRI) in an Integrated Services Digital Network (ISDN) communications system, comprising:

(a) a program controlled switch with at least one Primary Rate Interface (PRI);

(b) means for signalling said switch from a location external thereto to invoke a direct connection to a specific B-Channel on a switch PRI by calling a predefined switch Directory Number (DN); and (c) dial tone generation means for returning a dial tone from said switch to said location external whenever said predefined switch DN is called.

21. Apparatus as set forth in claim 20 further comprising:

(a) means for providing call data to said switch after receipt of said dial tone at said location external, wherein said call data includes a specific B-channel identifier and a specific PRI identifier;

(b) a program module associated with said program controlled switch for collecting the B-Channel identifier and PRI identifier provided;

(c) call routing means for routing the call via said switch to the PRI identified by said collected PRI identifier; and (d) call set up means for setting up the call via said switch to the specific B-Channel identified by said collected B-Channel identifier to thereby provide connectivity to the specified B-channel on said specific PRI from the location external to said switch.

* * * * *